United States Patent
Koh

(10) Patent No.: US 8,046,026 B2
(45) Date of Patent: Oct. 25, 2011

(54) PORTABLE COMMUNICATIONS TERMINAL HAVING CAMERA ASSEMBLY WITH TWO CAMERAS

(75) Inventor: Sung-Gyu Koh, Seoul (KR)

(73) Assignee: LG Electronics Inc., Seoul (KR)

( * ) Notice: Subject to any disclaimer, the term of this patent is extended or adjusted under 35 U.S.C. 154(b) by 846 days.

(21) Appl. No.: 12/113,277

(22) Filed: May 1, 2008

(65) Prior Publication Data

US 2009/0017867 A1  Jan. 15, 2009

(30) Foreign Application Priority Data

Jul. 13, 2007  (KR) .................. 10-2007-0070864

(51) Int. Cl.
*H04M 1/00* (2006.01)
*H04B 1/28* (2006.01)
*H04N 9/07* (2006.01)
*H04N 5/225* (2006.01)
*G03B 17/00* (2006.01)

(52) U.S. Cl. ............... 455/556.1; 455/333; 348/239; 348/373; 396/542

(58) Field of Classification Search ......... 455/556.1, 455/333; 348/373
See application file for complete search history.

(56) References Cited

U.S. PATENT DOCUMENTS

| | | | | |
|---|---|---|---|---|
| 6,160,967 A | * | 12/2000 | Mizobuchi | 396/542 |
| 2004/0021792 A1 | | 2/2004 | Yasui | |
| 2005/0046740 A1 | | 3/2005 | Davis | |
| 2005/0237424 A1 | * | 10/2005 | Weekamp et al. | 348/373 |
| 2006/0128346 A1 | * | 6/2006 | Yasui | 455/333 |
| 2006/0139463 A1 | * | 6/2006 | Heinonen | 348/239 |
| 2007/0070204 A1 | | 3/2007 | Mentzer | |
| 2008/0004073 A1 | * | 1/2008 | John et al. | 455/556.1 |

FOREIGN PATENT DOCUMENTS

| | | |
|---|---|---|
| CN | 1838692 | 9/2006 |
| EP | 1622364 | 2/2006 |
| EP | 1705875 | 9/2006 |
| WO | 2004/015986 | 2/2004 |

* cited by examiner

*Primary Examiner* — Dwayne Bost
*Assistant Examiner* — Timothy Pham
(74) *Attorney, Agent, or Firm* — Lee, Hong, Degerman, Kang & Waimey

(57) ABSTRACT

A first camera equipped for a video telephony and a second camera configured for capturing still or video images are combined into one assembly. The assembly is interconnected with a flexible printed circuit board then assembled into and connected with a portable communications terminal body. The assembly is configured for efficient integration with the terminal and saves assembly time and manufacturing costs.

10 Claims, 5 Drawing Sheets

PORTABLE COMMUNICATIONS TERMINAL HAVING CAMERA ASSEMBLY WITH TWO CAMERAS

Pursuant to 35 U.S.C. §119(a), this application claims the benefit of Korean Patent Application No. 10-2007-0070864 filed on Jul. 13, 2007, the content of which is incorporated herein by reference in its entirety.

FIELD OF THE INVENTION

The present invention relates to a portable terminal having one camera equipped for video telephony and another camera equipped for capturing still and video images.

DESCRIPTION OF THE RELATED ART

A portable terminal is a portable communications device having one or more functions such as video telephony function, an information function, a data storage function.

As the functions of terminals have become diversified, terminals have incorporate functions such as capturing still and video images, playing back music or video files, playing games, receiving broadcasts, and the like. Terminals also are used as integrated multimedia devices.

In a multimedia device, for instance, a user interface is provided in a terminal to enabling a user to easily and conveniently search for and select available functions.

Further, a terminal is often considered a personal belonging with which to express the user's personality, thereby requiring the terminal to have various designs. Currently, terminals have a video telephony function allowing two parties to view each other while talking, and a function of capturing still and video images.

Such a terminal has with two separate cameras—one for video telephony and another for capturing still and video images—complicating the manufacturing process. The need to assemble each camera, mounting, and connecting wiring in separate steps raises the cost and manufacturing complexity. Also, installation space and connection requirements are increased making it difficult to reduce the size and weight of a terminal.

SUMMARY

Accordingly, the present invention has been made to address the problems of the prior art, and an object of the present invention is to reduce the manufacturing costs of and to optimize space utilization within a mobile communications terminal having cameras for video telephony and capturing still or video images.

In one embodiment, a portable communications terminal has a terminal body having a camera mounting unit and a camera assembly mounted within the camera mounting unit wherein the camera assembly comprises a first camera and a second camera. The camera assembly comprises a camera housing in which the first camera is mounted on a first surface of the camera housing, and the second camera is mounted on a second surface of the camera housing, wherein the back of the first camera is affixed to the back of the second camera. The first camera lens is positioned to face a first side of the terminal body, and a camera lens of the second camera lens is positioned to face the opposite side of the terminal body.

The first camera is configured for video telephony, and the second camera is configured to capture a still or video image, and the first camera has a lower resolution than the second camera.

The camera housing has an opening through which the lens of the second camera protrudes thereby enabling the first and the second cameras to be affixed to the camera housing. The camera mounting unit further comprises a retaining ledge to prevent the camera housing from separating from the camera mounting unit when the camera housing is disposed within the camera mounting unit.

Each of the cameras is connected to a connecting flexible printed circuit board (FPCB) with separate FPCBs connectors on each end of the connecting FPCB. The connecting FPCB is then folded and placed in a FPCB mounting portion of the camera housing. Once the connecting FPCB is connected to the two cameras and placed in the camera housing with the cameras, the connecting FPCB is connected to a printed circuit board in the terminal.

In another embodiment, a method for assembling a portable communications terminal having a terminal body and a cameral assembly includes affixing a rear surface of a first camera to a rear surface of a second camera, wherein a lens of the first camera is positioned to face a first side of the terminal body, and a lens of the second camera is positioned to face a second side of the terminal body, mounting the first camera and the second camera in a camera housing, connecting the first camera to a first connector and the second camera to a second connector wherein the first and the second connectors are disposed on opposite ends of a connecting FPCB, and mounting the connecting FPCB in a FPCB mounting unit formed in the camera housing thereby completing a camera assembly. The camera assembly is mounted in a camera mounting unit of the terminal, and a third connector of the connecting FPCB is connected to a printed circuit board disposed in the terminal body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Embodiments of the present invention will be described in a more detailed manner with reference to the drawings. Reference will now be made in detail to embodiments of the present invention, examples of which are illustrated in the accompanying drawings.

Figure 1:
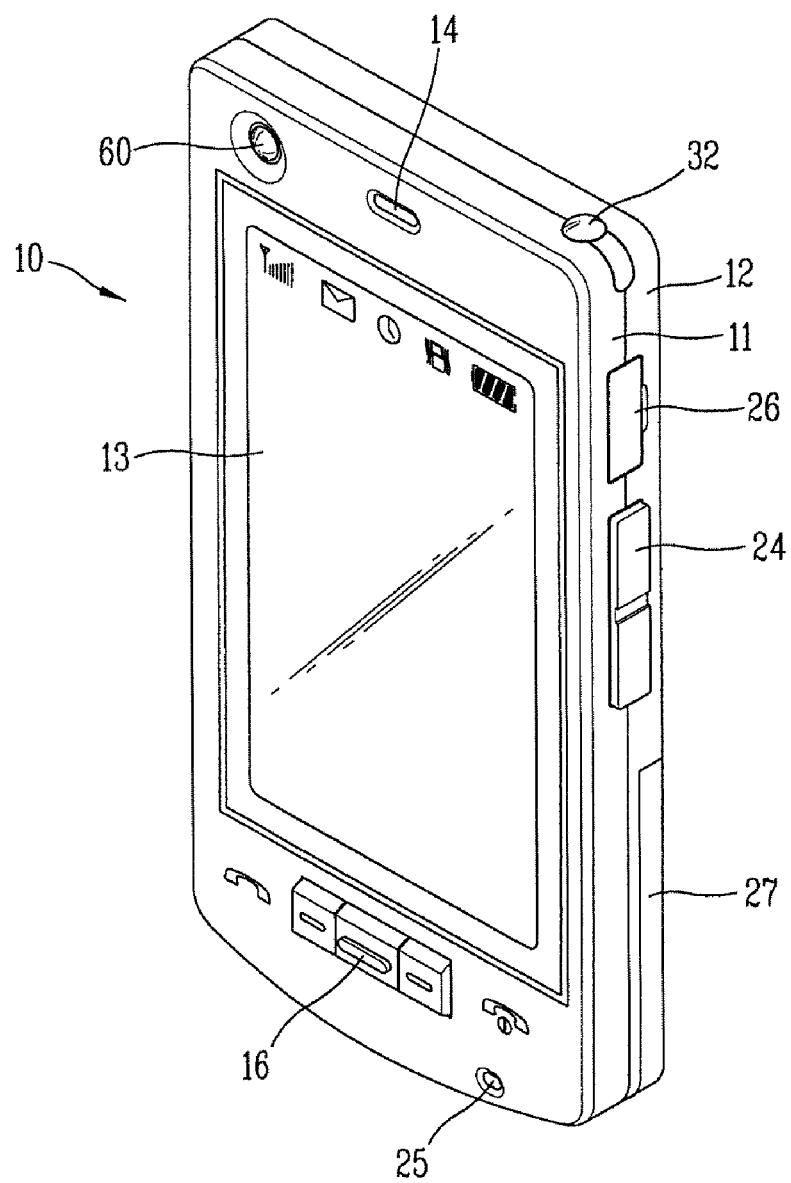
FIG. 1 is a front perspective view showing a terminal according to one embodiment of the present invention.
Figure 2:
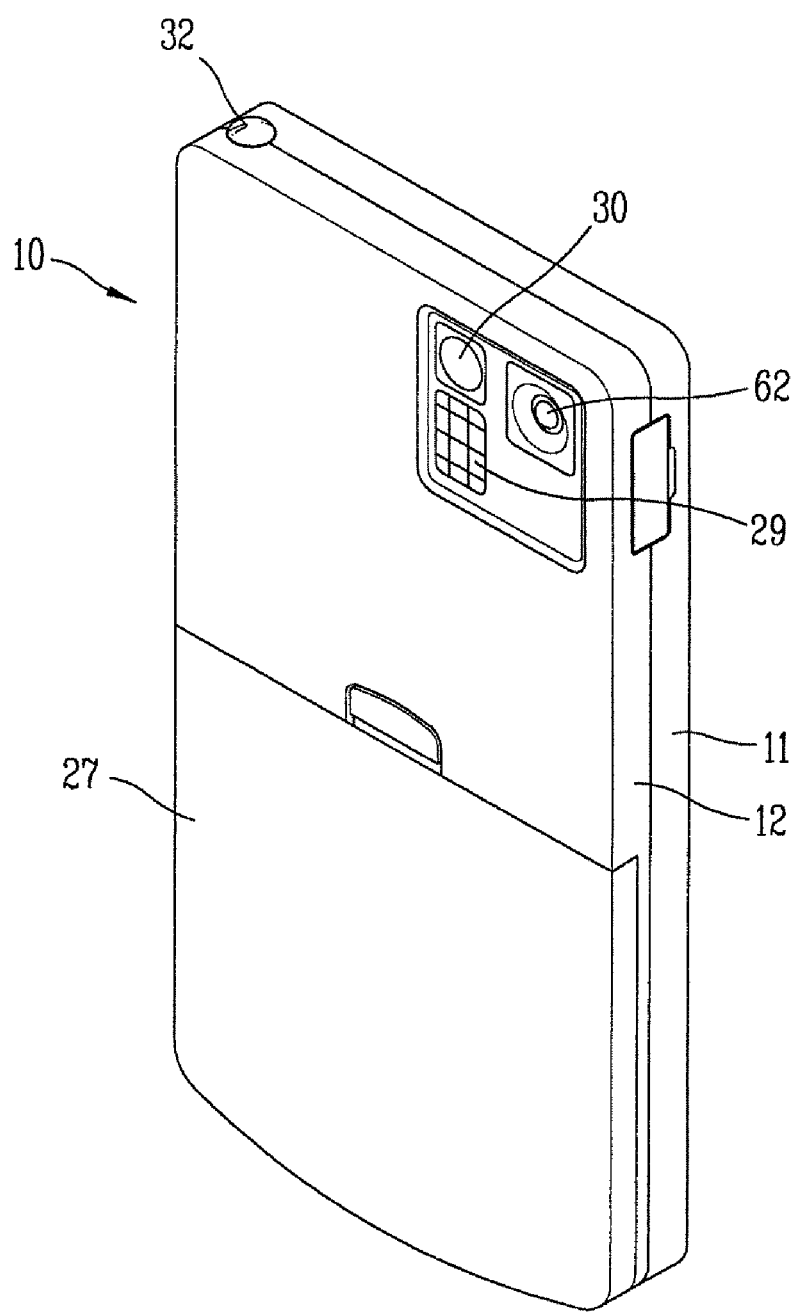
FIG. 2 is a rear perspective view showing the terminal of FIG. 1.

FIG. 1 and FIG. 2 show a front perspective view and a rear perspective view, respectively, of a terminal according to one embodiment of the present invention. The terminal includes a body 10, a display unit 13 located on a front surface of the body 10 to display information, and a camera assembly mounted within the body 10 as one assembly.

A case (casing, housing, or cover) forming the outer surface of the body 10 includes a front case 11 and a rear case 12. Various electronic components are mounted within the space formed between the front case 11 and the rear case 12. At least one intermediate case may additionally be disposed between the front case 11 and the rear case 12. The cases may be formed of an injection molded plastic, or formed using metallic material (e.g., stainless steel (SS) or titanium (Ti)).

The display unit 13, a speaker 14, and a first control unit 16 may be positioned on the body 10, more particularly, on the front case 11. The display unit 13 may include a Liquid Crystal Display (LCD) module, or an Organic Light Emitting Diode (OLED) module, for example, for providing a visual display of information. The display unit 13 may further include a touch screen to accept user information and commands.

The first control unit 16 enables a user to provide inputs or commands to control the operation of the terminal. The first control unit 16 may be implemented in any of various types known in the art so long as it is capable of being operated in a tactile manner. For instance, the first control unit 16 may be a dome switch, a touch screen, or a touch pad operated by a user's push or touch manipulation, or may be configured as a wheel, a jog type or a joy stick by which input keys are rotated.

A second control unit 24 may be positioned at a side surface of the body 10. The first control unit 16 provides commands, such as start, stop, scroll, and the like. The second control unit 24 can be operated as a hot-key for performing a specific function, such as activating a first camera 60.

A first audio input unit 25 may be implemented, for instance, as a microphone to receive a user's voice or other sounds.

Interface 26 is a communication port allowing the terminal to exchange data with external devices. For instance, interface 26, can be at least one of a headphones jack, a port for a short-range communication (e.g., infrared data association (IrDA) port, a Bluetooth port, a wireless LAN port), and a power supply terminal to supply power to the portable terminal. The interface 26 also may be configured as a card socket for receiving an external card, such as a SIM (subscriber identification module) card, UIM (user identity module) card, and a memory card for information storage.

A battery unit 27 for supplying power to the portable terminal is mounted at a rear case 12 side. The battery unit 27 can be detachably coupled to the rear case 12 for replacement or recharging.

A broadcast signal receiving antenna 32, in addition to an antenna for a mobile call (not shown), may be disposed at one side of the terminal body 10. The antenna 32 may be capable of being extended from the terminal body 10.

Figure 3:
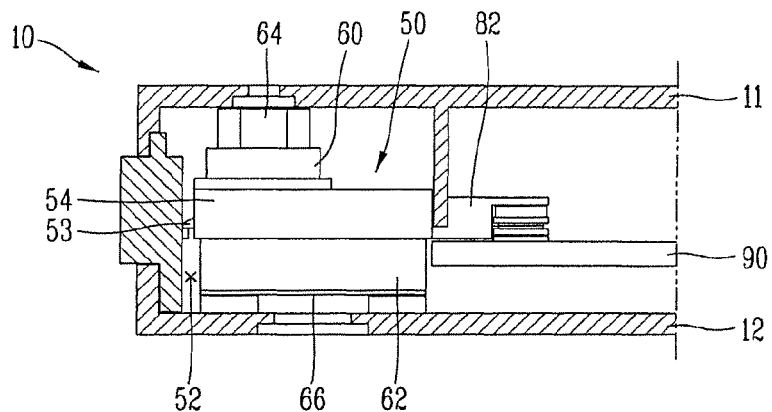
FIG. 3 is a cross-sectional view showing a camera assembly mounted in the terminal body of FIG. 1.
Figure 4:
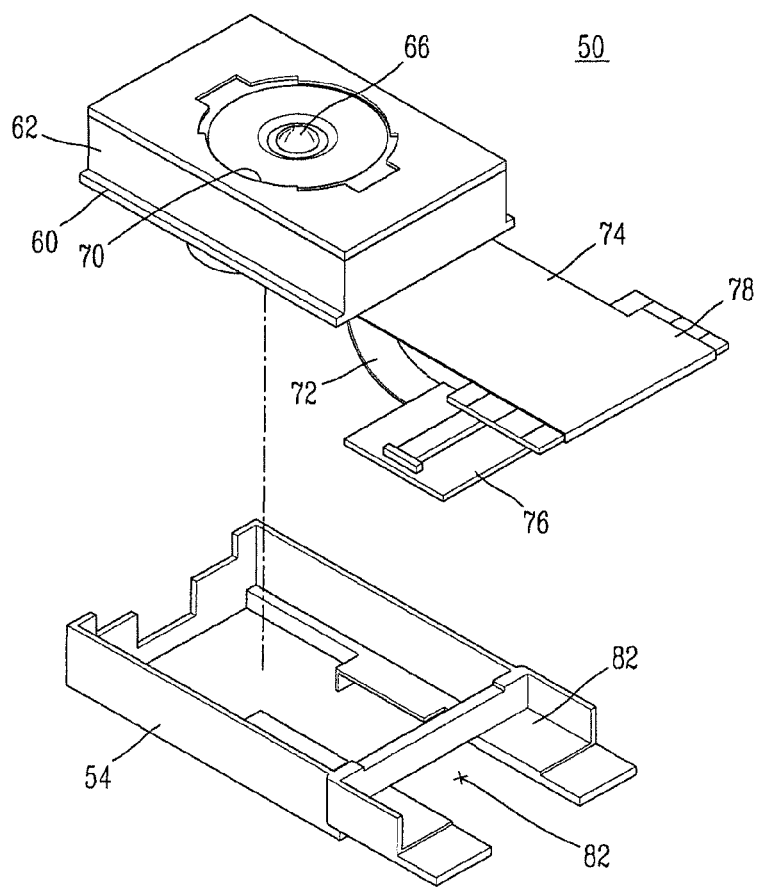
FIG. 4 is an exploded perspective view of the camera assembly shown in FIG. 3.
Figure 5:
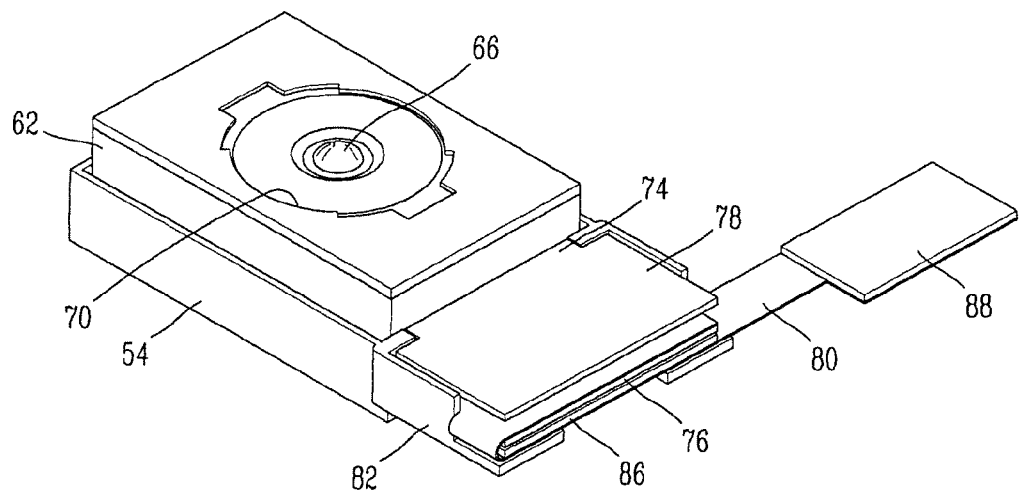
FIG. 5 is a front perspective view of the camera assembly shown in FIG. 3.
Figure 6:
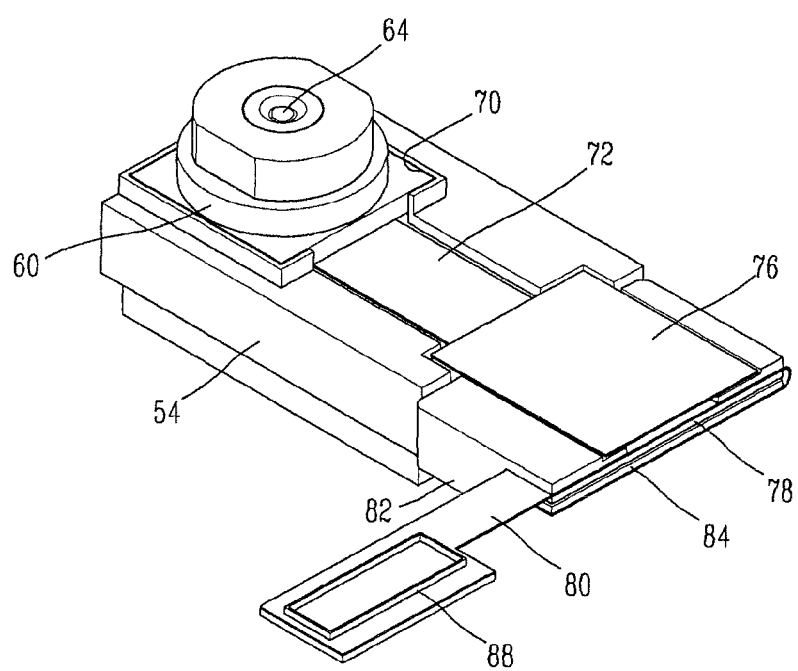
FIG. 6 is a rear perspective view of the camera assembly shown in FIG. 3.

FIG. 3 is a cross-sectional view showing a camera assembly 50 mounted in the terminal body 10. FIG. 4 is an exploded perspective view of the camera assembly 50. FIGS. 5 and 6 are perspective views of the camera assembly.

The camera assembly 50 includes a camera housing 54 disposed in a camera mounting unit 52 formed inside the terminal body 10, a first camera 60 mounted on the camera housing 54 and disposed to face the front of the terminal body 10, and a second camera 62 mounted on the camera housing 54 and disposed to face the rear of the terminal body 10. The first and second cameras 60 and 62 are integrally assembled together by affixing their respective rear surfaces to one another. A first camera lens 64 is disposed on a front surface of the first camera 60, and a second camera lens 66 is disposed on a front surface of the second camera 62.

The camera housing 54 is formed to have a rectangular bracket shape. A first camera mounting portion 70 for inserting the first camera 60 is disposed in the front of the camera housing 54, and the rear of the camera housing 54 has an open configuration for mounting the second camera 62. That is, since the first and second cameras 60 and 62 are integrally assembled together, and if the first and second cameras 60 and 62 are received in an open position in the camera housing 54, the first camera 60 is inserted into the first camera mounting portion 70 and the second camera 62 is disposed in the open position of the camera housing 54.

Here, since the first camera 60 is smaller in size than the second camera 62, the first camera 60 is coupled, in a fitting manner, into the first camera mounting portion 70 formed within the camera housing 54, and a portion of the first camera 60 to which the camera lens 64 is mounted protrudes toward the outside of the camera housing 54. The size of the first camera mounting portion 70 can be changed according to the size of the first camera 60.

A retaining ledge 53 for abutting an inner surface of the terminal body 10 may be formed extending at one side of the camera housing 54 to prevent a separation of the camera housing 54 from the camera mounting unit 52 when the camera housing 54 is mounted in the camera mounting unit 52.

Since the camera lens 64 is mounted exposed toward the front surface of the terminal body 10 when the terminal is used for video telephony, the first camera 60 serves to capture the image of the user for transmission to another party. Since the camera lens 66 is mounted exposed toward the rear surface of the terminal body 10, the second camera 62 serves to capture still or video images.

A flash element 29 and a mirror 30 (see, FIG. 2) are additionally disposed adjacent to the second camera 62 on the rear surface of the terminal body 10. When the second camera 62 is used to take a photo of an object, the flash 29 illuminates the object. When the user uses the second camera 62 to take a picture of himself (in a self-portrait mode), the mirror 30 may be used for the user to reflect the user's face.

Preferably, the first camera 60 has a lower resolution enabling capturing an image of the user and transferring the image to the other party for video telephony. The higher resolution of the second camera 62 is useful for obtaining higher quality images for later use.

A first flexible printed circuit board (FPCB) 72 is connected to the first camera 60 for electrically connecting the first camera 60 to a printed circuit board 90 disposed in the terminal body 10. A second FPCB 74 is connected to the second camera 62 for electrically connecting the second camera 62 and the printed circuit board 90. Further, a first connector 76 is mounted at an end of the first FPCB 72, and a second connector 78 is mounted at an end of the second FPCB 74.

An FPCB mounting unit 82 for mounting the first FPCB 72, the second FPCB 74, and a connecting FPCB 80 is formed in the camera housing 54. The first and second FPCBs 72 and 74 are connected to the connecting FPCB.

Figure 7:
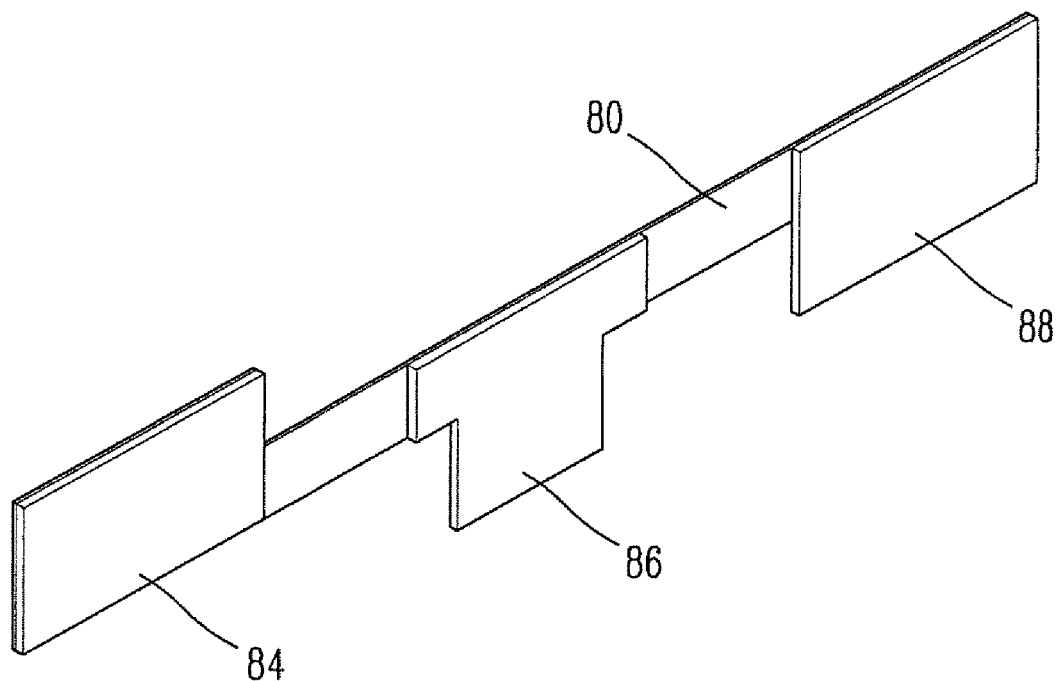
FIG. 7 is a perspective view showing a connecting FPCB of the camera assembly shown in FIG. 3.

As shown in FIG. 7, a third connector 84 for connecting to the first connector 76 is mounted at one end of the connecting FPCB 80. A fourth connector 86 for connecting to the second connector 78 is mounted at an intermediate portion of the connecting FPCB 80. A fifth connector 88 for connecting to the printed circuit board 90 is mounted at another end of the connecting FPCB 80.

The connecting FPCB 80 may be accommodated, in a folded state, in the FPCB mounting unit 82 such that the third connector 84 is disposed on the front surface of the connecting FPCB 80 and the fourth connector 86 is disposed on the rear surface of the connecting FPCB 80.

Therefore, the first FPCB 72 connected to the first camera 60 and the second FPCB 74 connected to the second camera 62 are respectively connected to the connecting FPCB 80, and the connecting FPCB 80 is connected to the printed circuit board 90, thereby requiring mounting of only one connector on the printed circuit board 90. Accordingly, the size of the mounting area on the printed circuit board can be reduced.

With such a configuration, the assembly operation of the camera assembly 50 according to one embodiment of the present invention will now be described in detail. The first camera 60 and the second camera 62 are assembled in one assembly. The rear surfaces of each of the first and second cameras 60 and 62 are fixed to each other by using an adhesive, or the like, so that the camera lens 64 of the first camera 60 faces towards the front of the terminal 10, and the camera lens 66 of the second camera 62 faces towards the rear of the terminal 10.

Next, the integrally joined first and second cameras 60 and 62 are mounted into the camera housing 54. Then, the first connector 76 and the second connector 78, which are respectively mounted at the ends of the first FPCB 72 connected to the first camera 60 and the second FPCB 74 connected to the second camera 62, are mounted at the third connector 84 and the fourth connector 86 each disposed at the connecting FPCB 80. The connecting FPCB 80 is mounted at the FPCB mounting unit 82 formed in the camera housing 54, thereby completing the camera assembly 50.

Once the camera assembly 50 is mounted in the camera mounting unit 52 and the fifth connector 88 mounted on the connecting FPCB 80 is electrically connected to the printed circuit board 90, the camera assembly 50 is mounted in the terminal body 10.

The implementation of the above-mentioned camera assembly is not limited to bar-type terminals as shown in FIG. 1, but can also be applied to the various types of terminals including a slide-type, a folder-type (flip type), a swing-type, or the like.

Since the first camera 60 for video telephony and the second camera 62 for capturing still or video images are formed as one assembly, and assembled into the terminal body 10, the terminal with the above configuration can facilitate the assembly operations and minimize an installation space in the terminal body.

In addition, the connecting FPCB 80 is connected to the first FPCB 72 (which in turn is connected to the first camera 50) and the second FPCB 74 (which in turn is connected to the second camera 62). Accordingly, only one connector of the connecting FPCB 80 needs to be connected to the printed circuit board 90, thereby saving an installation space on the printed circuit board.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable communications terminal, comprising:
a terminal body having a camera mounting unit; and
a camera assembly mounted within the camera mounting unit and comprising a camera housing on which a first camera and a second camera are disposed; and
a connecting flexible printed circuit board (FPCB) that is connected to a first FPCB and a second FPCB,
wherein the first camera is disposed on a first surface of the camera housing and the second camera is disposed on a second surface of the camera housing,
wherein the camera housing is configured to have an opening through which a lens of the second camera protrudes in order to enable the first and the second cameras to be affixed to the camera housing,
wherein the first FPCB connects the first camera to the connecting FPCB and the second FPCB connects the second camera to the connecting FPCB,
wherein the connecting FPCB further comprises a first connector disposed on a first end of the connecting FPCB configured to connect the connecting FPCB to the first FPCB,
wherein the connecting FPCB further comprises a second connector disposed on a second end of the connecting FPCB configured to connect the connecting FPCB with the second FPCB,
wherein the connecting FPCB further comprises a third connector configured to connect the camera assembly to a printed circuit board in the terminal, and
wherein the camera housing further comprises an FPCB mounting portion in which the connecting FPCB is disposed when the connecting FPCB is folded.

2. The terminal of claim 1, wherein a camera lens of the first camera is positioned to face a first side of the terminal body, and a camera lens of the second camera is positioned to face a second side of the terminal body.

3. The terminal of claim 1, wherein the first camera is configured for video telephony, and the second camera is configured to capture a still or video image.

4. The terminal of claim 3, wherein the first camera has a lower resolution than the second camera.

5. The terminal of claim 1, wherein a rear surface of the first camera is affixed to a rear surface of the second camera.

6. The terminal of claim 1, wherein the camera mounting unit further comprises a retaining ledge configured to prevent the camera housing from separating from the camera mounting unit when the camera housing is disposed within the camera mounting unit.

7. A method for assembling a portable communications terminal having a terminal body and a camera assembly, the method comprising:
affixing a rear surface of a first camera to a rear surface of a second camera, such that a lens of the first camera is positioned to face a first side of the terminal body and a lens of the second camera is positioned to face a second side of the terminal body;

mounting the first camera and the second camera in a camera housing;

connecting the first camera to a first connector and the second camera to a second connector wherein the first and the second connectors are disposed on opposite ends of a connecting FPCB; and mounting the connecting FPCB in a FPCB mounting unit formed in the camera housing thereby completing a camera assembly;

mounting the camera assembly in a camera mounting unit of the terminal; and connecting a third connector of the connecting FPCB to a printed circuit board disposed in the terminal body, wherein a first FPCB is configured to connect the first camera to the connecting FPCB and a second FPCB is configured to connect the second camera to the connecting FPCB, and wherein the camera housing is configured to have an opening through which a lens of the second camera protrudes thereby enabling the first and the second cameras to be affixed to the camera housing.

8. The method of claim 7, wherein the first camera is configured for video telephony, and the second camera is configured to capture still or video images.

9. The method of claim 8, wherein the first camera has a lower resolution than the second camera.

10. The method of claim 7, wherein the camera mounting unit further comprises a retaining ledge configured to prevent the camera housing from separating from the camera mounting unit when the camera housing is disposed within the camera mounting unit.

* * * * *